US006574644B2

(12) United States Patent
Hsu et al.

(10) Patent No.: US 6,574,644 B2
(45) Date of Patent: *Jun. 3, 2003

(54) AUTOMATIC CAPTURING OF HYPERLINK SPECIFICATIONS FOR MULTIMEDIA DOCUMENTS

(75) Inventors: Liang-Hua Hsu, Robbinsville, NJ (US); Russell Eric Benjamin Johnson-Laird, Princeton, NJ (US)

(73) Assignee: Siemens Corporate Research, Inc, Princeton, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,434

(22) Filed: Nov. 26, 1997

(65) Prior Publication Data

US 2001/0049698 A1 Dec. 6, 2001

(51) Int. Cl.[7] .............................................. G06F 15/00
(52) U.S. Cl. ..................... 707/501.1; 707/513; 345/744
(58) Field of Search ................................ 707/501, 513, 707/514, 515, 501.1; 345/335, 356, 744

(56) References Cited

U.S. PATENT DOCUMENTS

| 4,827,404 A | * | 5/1989 | Sharif-Askary et al. .... 707/101 |
| 4,982,344 A | * | 1/1991 | Jordan ......................... 707/501 |
| 5,297,249 A | * | 3/1994 | Bernstein et al. ........... 345/356 |

(List continued on next page.)

OTHER PUBLICATIONS

Liu et al., Towards Automating the Creation of Hypermedia Service Manuals be Compiling Specifications, IEEE, May 1994, pp. 203–212.*

Yokosato et al., Extension of a Hypermedia System Using the External Anchor Management Method, ACM, 1997, pp. 301–308.*

Zheng et al., Text–Hypertext Mutual Conversion and Hypertext Interchange through SGML, ACM 1993, pp. 139–147.*

Gorodetsky et al., Effective Use of Multimedia for Presentation.*

Min et al., SHyD—a Model for Bridging Text and Hypermedia, ACM 1993, pp. 418–424.*

Ip et al., A Hyperdocument Architecture for Cardiac Catheterisation Documents, IEEE, Jun. 1993, pp. 100–105.*

Elmasri et al., Fundamentals of Database Systems, Benjamin/Cummings Publishing Company, Inc., 1994, p. 622.*

Hung, Dynamic Hypermedia Presentations: A Model an its Implementation, IEEE International Conference, Jun. 1997, pp. 805–810.*

Newcomb, Multimedia Interchange Using SGML/HyTime, IEEE Multimedia, 1995, pp. 86–89.*

Levine et al., Lex & Yacc, O'Reilly & Associates, Inc., preface and p. 116, 1992.*

*Primary Examiner*—Heather R. Herndon
*Assistant Examiner*—Cong-Lac Huynh
(74) *Attorney, Agent, or Firm*—Donald B. Paschburg (57) ABSTRACT

A system of hyperlink authoring allows authors to establish links in multimedia documents interactively and provides generalization and specialization mechanisms for transforming the content and context of the instances of links indicated by the authors into more general link rules that when executed can automatically generate a large number of syntactically similar links. A major component of the system, the link editor, comprises specifications for the source, the intermediate destination, if required, and the final destination. Each specification comprises content pattern generalization, pattern variable instantiation, attribute modification, context specialization and attribute variable instantiation. The output of the link editor is link specifications which are forwarded to an automatic hyperlinker which outputs linked documents.

12 Claims, 11 Drawing Sheets

U.S. PATENT DOCUMENTS

| | | | |
|---|---|---|---|
| 5,404,534 A | * 4/1995 | Foss et al. | 709/315 |
| 5,430,872 A | * 7/1995 | Dahod et al. | 707/104 |
| 5,603,025 A | * 2/1997 | Tabb et al. | 707/2 |
| 5,634,062 A | * 5/1997 | Shimizu et al. | 707/501 |
| 5,649,190 A | * 7/1997 | Barstow et al. | 345/952 |
| 5,694,594 A | * 12/1997 | Chang | 707/501 |
| 5,708,825 A | * 1/1998 | Sotomayor | 707/501.1 |
| 5,724,595 A | * 3/1998 | Gentner | 707/501 |
| 5,794,257 A | * 8/1998 | Liu et al. | 707/501 |
| 5,809,317 A | * 9/1998 | Kogan et al. | 707/501.1 |
| 5,838,916 A | * 11/1998 | Domenikos et al. | 709/219 |
| 5,845,301 A | * 12/1998 | Rivette et al. | 707/512 |
| 5,890,171 A | * 3/1999 | Blumer et al. | 707/501 |
| 5,893,109 A | * 4/1999 | DeRose et al. | 707/104 |
| 5,933,841 A | * 8/1999 | Schumacher et al. | 707/501 |
| 5,963,205 A | * 10/1999 | Sotomayor | 707/531 |
| 5,995,659 A | * 11/1999 | Chakraborty et al. | 382/176 |
| 6,029,182 A | * 2/2000 | Nehab et al. | 707/523 |
| 6,098,081 A | * 8/2000 | Heidorn et al. | 707/501.1 |
| 6,430,563 B1 | * 8/2000 | Fritz et al. | 707/10 |
| 6,138,129 A | * 10/2000 | Combs | 707/6 |
| 6,141,003 A | * 10/2000 | Chor et al. | 345/327 |
| 6,154,754 A | * 11/2000 | Hsu et al. | 707/513 |
| 6,253,631 B1 | * 7/2001 | Malcolm | 707/10 |
| 6,321,244 B1 | * 11/2001 | Liu et al. | 707/523 |
| 6,424,978 B1 | * 7/2002 | Liu et al. | 707/501.1 |
| 6,462,754 B1 | * 10/2002 | Chakraborty et al. | 345/723 |

* cited by examiner

```
link L010:"Figure to photo image" {
    source {
        content type = TEXT/SGML;
        manual = 3.1;
        pattern {
            "Fig. 1. Gas Turbine with Generator";
        }
        context {
            <Figure> inside (<AnyDoc> containing(<DocHeader> with
            Id=N00049420));
        }
    }
    destination {
        content type = IMAGE/GIF;
        pattern {
            "images/v942/9420.gif";
        }
        context {
        }
    }
}
```

FIG. 4

```
link L020:"Figure reference to figure"(
    source {
        content type = TEXT/SGML;
        manual = 3.1;
        pattern {
            "See Fig."***{[0-9]*/%a};
        }
        context {
            <Para> inside (<AnyDoc> containing(<DocHeader> with Id=%y});
        }
    }
    destination {
        content type = TEXT/SGML;
        manual = 3.1;
        pattern {
            "Fig."***"&a".";
        }
        context {
            <Figure> inside (<AnyDoc> containing <DocHeader> with Id=&y);
        }
    }
}
```

FIG. 5

```
link L040:"KKS number to P+I diagram" {
    source {
        content type = TEXT/SGML;
        manual = 3.1;
        pattern {
            {"MB"[A-Z][0-9][0-9]/%c} {[A-Z][A-Z][0-9][0-9][0-9]/%d};
        }
        context {
            (~/(<Table> or <AIUDoc>)) inside <AnyDoc>;
        }
    }
    destination {
        content type = TEXT/SGML;
        manual = 3.1;
        pattern {
            {[0-9][0-9]*/%y};
        }
        context {
            (<DocHeader> with File=&y".aiu") inside (<AIUDoc>containing
            <AIU > with Name="&c_&d");
        }
    }
    destination {
        content type = PIDIAGRAM/CGM;
        pattern {
            "schematic/v942/"&y".cgm";
        }
        context {
        }
        focus {
            &c_&d;
        }
    }
}
```

```
SEE FIG. 1        ⟹   "SEE FIG."*"[0-9]+
SEE FIG. 1-1      ⟹   "SEE FIG."*"[0-9]+"-"[0-9]+
MBN11CQ001        ⟹   "MB"[A-Z][0-9][0-9][A-Z][A-Z][0-9][0-9][0-9]
3.1-5080-9420     ⟹   "3.1"*"-"[0-9][0-9][0-9][0-9]"-"*
05600 010/01      ⟹   [0-9][0-9][0-9][0-9][0-9]*"[0-9][0-9][0-9]"/"[0-9][0-9]
```

AUTOMATIC CAPTURING OF HYPERLINK SPECIFICATIONS FOR MULTIMEDIA DOCUMENTS

BACKGROUND OF THE INVENTION

1. Field of the Invention

The present invention relates to hyperlink authoring and more particularly to utilizing user friendly interactive hyperlinking tools with a powerful hyperlink specification.

2. Description of the Prior Art

Although the concept of hypertext was invented many years ago, it has only become wide-spread after the advent of various document standards and powerful browsers. The hypertext approach has also been generalized to include not only textual documents but also all types of non-textual media, e.g., photo images, CAD drawings, audio, video, etc. in hypermedia applications. Typically, documents in various formats are processed and linked together so that when browsing one document, the user can quickly access related information in other parts of the same document or in other documents in different formats by simply pointing-and-clicking.

The fundamental problem of creating links on a large scale, between information contained within documents, has remained largely unsolved. Existing commercial tools are available for establishing links interactively but each link has to be created individually. These types of interactive tools are good for creating a small number of links in the documents or when the links to be created bear no discernable relationship to each other. In a publication by Peiya Liu, Ken Hampel and Arding Hsu entitled "Towards Automating the Creation of Hypermedia Service Manuals by Compiling Specifications", Proc. of Int'l Conf. on Multimedia Computing and Systems, IEEE Computing Soc. Press, 1994, pp. 203–212, the approach of using syntactic rules to automatically create a large number of related links by pattern matching algorithms was outlined. These syntactic rules can be specified using a custom-built language, called the Hyperlink Specification Language. Such a rule-based approach is good for dealing with information that is related more systematically in, for example, technical documents.

Since technical documents are highly cross-referenced and technical data can often be related by well-defined naming conventions in the industry, link specifications can be systematically created and hyperlinking can be performed automatically by parsing the link specifications. In order to provide a single format as input to the hyperlinking process, all source information is represented in SGML (Standard Generalized Markup Language). SGML is described in SGML, ISO 8879:1986 Text and Office Systems—Standard Generalized Markup Language, Geneva, 1986. Textual documents are created directly with SGML editors or converted to SGML from other word processor formats. Non-textual documents such as images, drawings, video or audio are processed by Anchorable Information Unit (AIU) extractors that implement sophisticated graphics and imaging algorithms. A typical AIU specification for an object in an image specifies the coordinates of the object and some textual description of the object. The textual description can be terms such as rectangle, polygon, or possibly some higher-level terms. AIU files are also represented in SGML, similar to textual documents.

Figure 1:
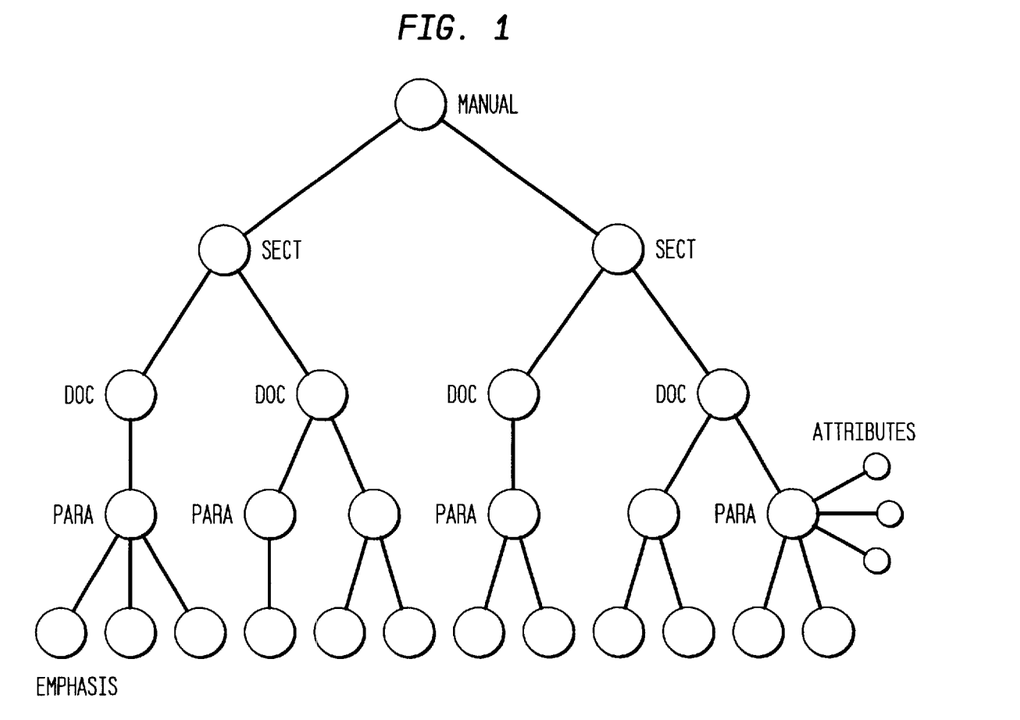
FIG. 1 illustrates an example of an SGML structure.

SGML is a meta-language for defining document structures which is referred to as Document Type Definition (DTD). An SGML document is an instance of its associated DTD. Conceptually speaking, the structure of an SGML document is an upside-down tree that is composed of SGML elements (or more generally, document objects). For information on the SGML syntax, refer to the publication mentioned above by Peiya Liu, Ken Hampel and Arding Hsu entitled "Towards Automating the Creation of Hypermedia Service Manuals by Compiling Specifications", Proc. of Int'l Conf. on Multimedia Computing and Systems, IEEE Computing Soc. Press, 1994, pp. 203–212. An SGML element is thus either a leaf object whose content is the actual text (or any data code) or an interior object whose content is an SGML sub-structure in addition to any possible text (or code). An SGML element is also associated with a list of attributes, e.g., id., type, name, etc. that provides additional information to characterize the element. An example of a generic manual structure is shown in FIG. 1.

However, creating specifications for hyperlinks requires knowledge of computer languages which makes it inconvenient for most authors whose main expertise is in technical writing. It is an object of the present invention to provide a solution to this problem by providing a system where the author only has to indicate an example. This example is a member of the class of objects that the user wishes to generate a link specification for.

SUMMARY OF THE INVENTION

The present invention is a system of hyperlink authoring which takes advantage of both the user-friendliness of interactive hyperlinking tools and the power of the hyperlink specification language. A software system, referred to as an Interactive Hyperlink Specification Editor (Link Editor) is included in the present invention and encapsulates this new method of hyperlink authoring. This system allows authors to establish links in multimedia documents interactively and provides generalization and specialization mechanisms for transforming the content and context of the instances of links indicated by the authors into link rules that when executed can automatically generate a large number of syntactically similar links.

With the present invention, through the link editor, the author is removed from having to possess any knowledge of the underlying hyperlink specification language. The link editor allows the authors to establish links in multimedia documents interactively and provides various mechanisms for transforming the instances of links indicated by the authors into more general link rules that apply to a large number of related links.

The link editor comprises specifications for the source, the intermediate destination, if required, and the final destination. A source document, an intermediate destination document, if required, and a final destination document is input by a user to the respective specification. Each specification comprises content pattern generalization, pattern variable instantiation, attribute modification, context specialization and attribute variable instantiation. The output of the link editor is link specifications which are provided to the automatic hyperlinker.

DETAILED DESCRIPTION OF THE INVENTION

The present invention is a system for capturing hyperlinks which integrates the user-friendliness of interactive hyperlinking tools and the power of a hyperlink specification language. With this system, single link instances can be created simply by pointing-and-clicking while general link rules that apply to a large number of related links can be derived from link instances with generalization and specialization mechanisms.

The present invention is derived from the following aspects which will be further described below.
1. The four principal elements of an object, i.e., attributes, proper content, relevant context, and focus, are identified for specifying hyperlinks. Typically, "proper content" refers to the printable ASCII characters (or any code) of an object, excluding any sub-structure and "relevant context" refers to the relationships of an object to its immediate ancestors, descendents and siblings.
2. A process is designed to capture the link specifications; capturing source specification, capturing intermediate destination specifications, and capturing final destination specification.
3. Two principles, generalization and specialization, are applied to derive link rules from link instances.
4. An automatic process is designed for generalizing the patterns of the proper content of an object; content segmentation, alphabetic pattern substitution, numeric pattern substitution, and special symbol substitution.
5. Content segmentation is a mechanism to break a content pattern into segments based on the classification of the content code. The segmentation results can be refined by the authors. The segmented patterns are generalized by replacing each segment with a regular expression based on the requirements of the hyperlinking applications.
6. An automatic process is designed for specializing the context of an object; ancestor relationship, descendent relationship, sibling relationship, attribute modification, and negation.
7. The relationships of an object to its immediate ancestors, descendents, and siblings can be identified in the document tree which are automatically included into the context specification. In addition, attributes can be added to further constrain the scope of a link rule and the negation operators can be applied to invert a context (or sub-context).

Figure 2:
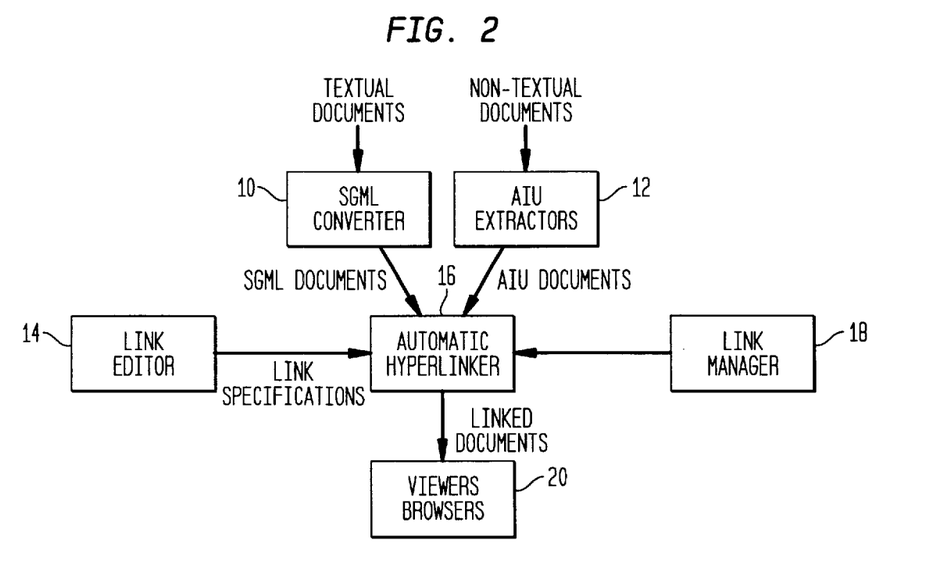
FIG. 2 illustrates a block diagram of the present invention, the automatic capturing of hyperlink specifications.

A block diagram of the present invention is shown in FIG. 2. The overall system takes source documents (textual documents and non-textual documents) as an input and generates linked documents as an output. Textual documents are fed into SGML converter 10 where SGML documents are prepared. Non-textual documents are fed into AIU extractors 12 where AIU documents are prepared. A major component of the present invention, link editor 14, prepares link specifications. The SGML documents, the AIU documents and the link specifications are fed into automatic hyperlinker 16. The actual links can be stored separately in the files or inserted into the documents. This is decided by the implementation of automatic hyperlinker 16. Link manager 18 connected to automatic hyperlinker 16 records exactly what hyperlinker 16 does and reminds the authors of what hyperlinker 16 has done in the past. The link information is mainly used by hyperlinker 16 to support incremental hyperlinking. The link information is also used by viewers and browsers 20, for example, to invoke different sets of links on the same set of documents for different applications.

The following will describe the hyperlink specification language. As outlined in the publication mentioned above by Peiya Liu, Ken Hampel and Arding Hsu entitled "Towards Automating the Creation of Hypermedia Service Manuals by Compiling Specifications", Proc. of Int'l Conf. on Multimedia Computing and Systems, IEEE Computing Soc. Press, 1994, pp. 203–212, a hyperlink specification language has been developed for defining syntactically the relationship between the kinds of objects that should serve as the source for a link (i.e., source AIUs) and the corresponding objects that should serve as the destination (i.e., destination AIUs). A link specification can be as simple as a pair of specific instances of AIUs or a link specification can be a general rule that specifies the relationship between two groups of AIUs.

In general, a link specification file consists of a list of link specifications (or rules) and each rule specifies the source object and the destination object of a type of link. A source or destination object of a link is identified by a list of attributes, a pattern of its content, a description of its context, and a list of focus items. The hyperlink specification language supports regular expressions for pattern specifications, hierarchical structural relationships for context specifications, and variable instantiations for passing values between different portions of the specification.

Figure 3:
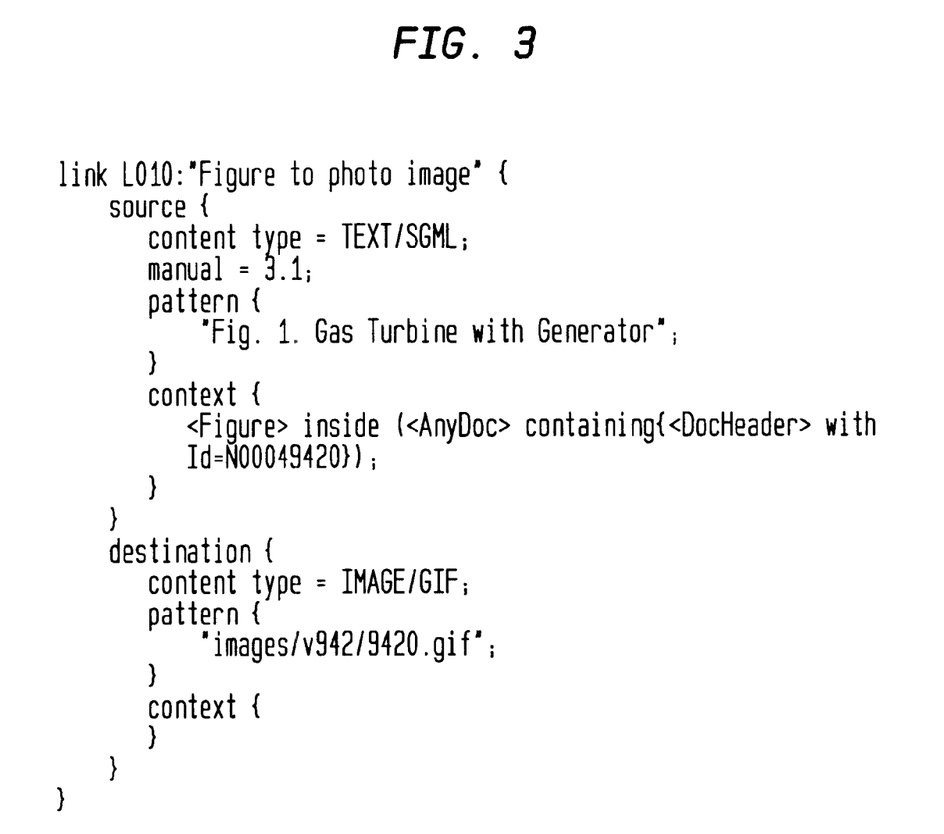
FIG. 3 illustrates an example of a single link.

An example of a specification for a single link is shown in FIG. 3. The in-line graphics "FIG. 1. Gas Turbine with Generator" inside the <AnyDoc> object whose Id is N00049420 is linked to the photo image in "images/v942/9420.gif" (under some top-level document directory). Assuming the Id attribute is unique, this link specification will cause the hyperlinker to find and generate one single link instance. Alternatively, if the <Figure> object is associated with a unique Id, it can also be used in the context specification.

Figure 4:
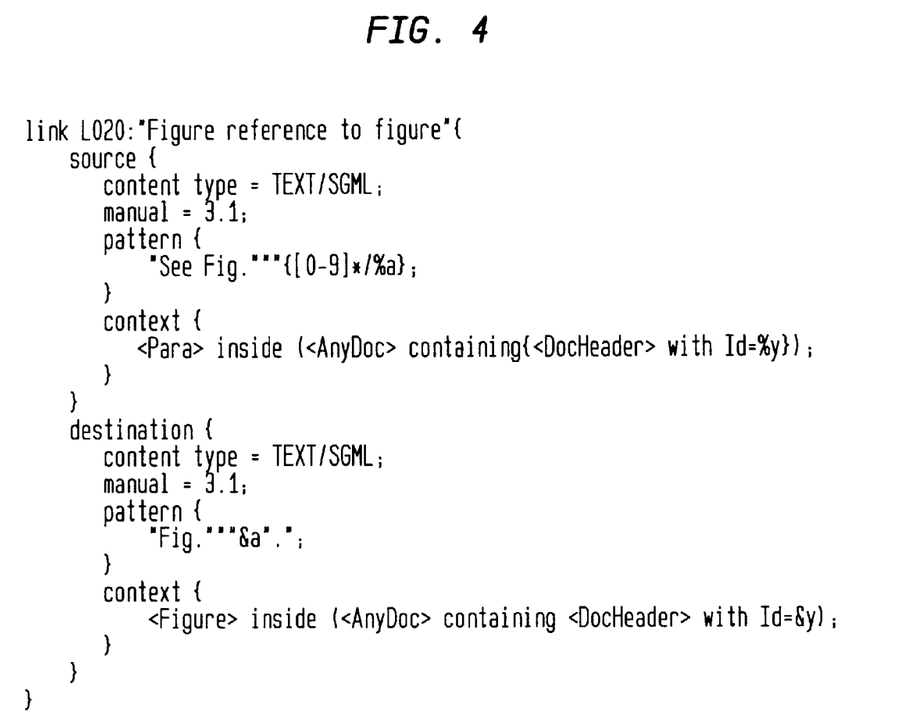
FIG. 4 illustrates an example of a link specification.

An example of a more general link rule is shown in FIG. 4. A pattern of "See Fig. <number>" in any <Para> in any <AnyDoc> is linked to the <Figure> whose title begins with "Fig. <number>. " and is located in the same <AnyDoc>. Thus, the scope of figure references is <AnyDoc> and is constrained by the Id attribute.

Figure 5:
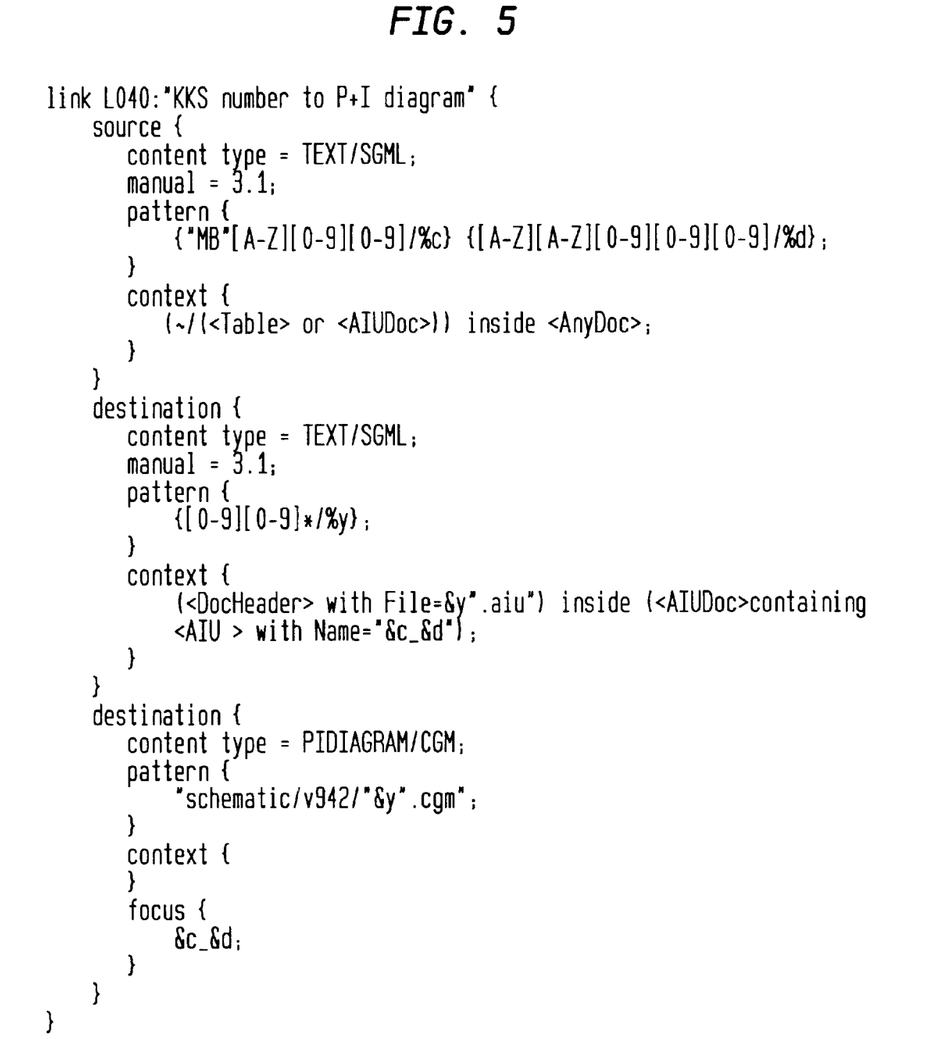
FIG. 5 illustrates an example of a chain link specification.

There are two classes of links: direct link and chain link. A direct link relates a source object to a destination object directly while a chain link involves one or more intermediate objects before reaching the final destination. An example of a chain link specification is shown in FIG. 5. The rule uses an intermediate destination to identify the AIU file of the P&I (Piping and Instrumentation) diagram that contains the KKS number pattern (a naming convention in the power plant industry). Then the file name of the AIU file is extracted to form the file name of the P&I diagram.

The following will describe hyperlink authoring. The link editor allows the author to establish a single link between two specific pieces of information and if necessary, transform a single link instance into a general link rule in the syntax as described above. The author can create not only direct links but also chain links that go through one or more intermediate documents to their final destinations. If necessary, chain links can also be transformed into link rules with intermediate destination specifications.

Figure 6:
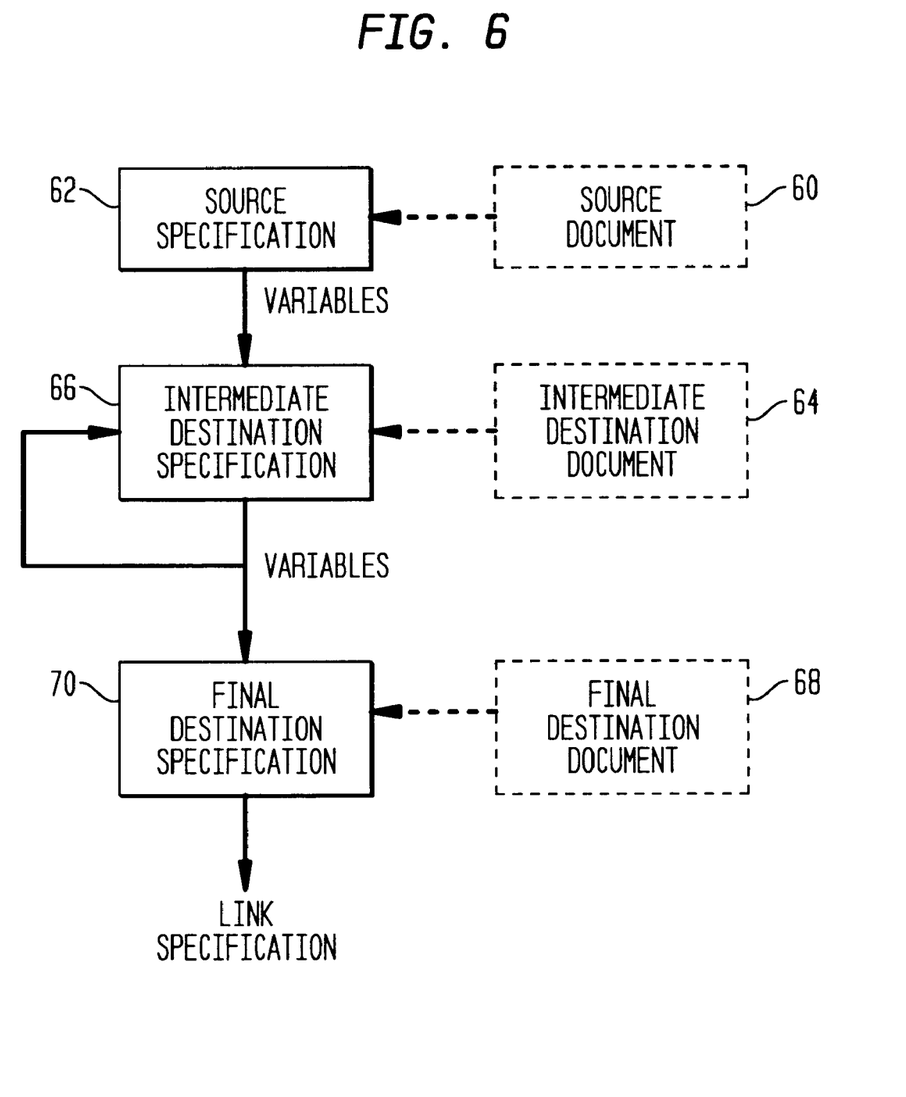
FIG. 6 illustrates a block diagram of the link editor of the hyperlink authoring system of the present invention.

The system of hyperlink authoring of the present invention is shown in FIG. 6 which is a block diagram of the link editor. The author first identifies an object in the source document 60 and creates a source specification 62. Some information in the source specification 62 such as segments of content patterns or attributes of objects in the context can be assigned to variables and used within the source specification 62 or passed to the following steps. A similar procedure is repeated for identifying intermediate destination objects and creating an intermediate destination specification 66 from an intermediate destination document 64 except that the intermediate destination specification 66 can also make use of information passed from the previous steps to refine their contents and contexts. The intermediate destination specification 66 is optional in that it may not be necessary to obtain the link specification. Again, a similar procedure is repeated for identifying the final destination object and creating a final destination specification 70 from a final destination document 68 and similarly, the final destination specification 70 can also make use of all information passed from any previous steps.

Figure 7:
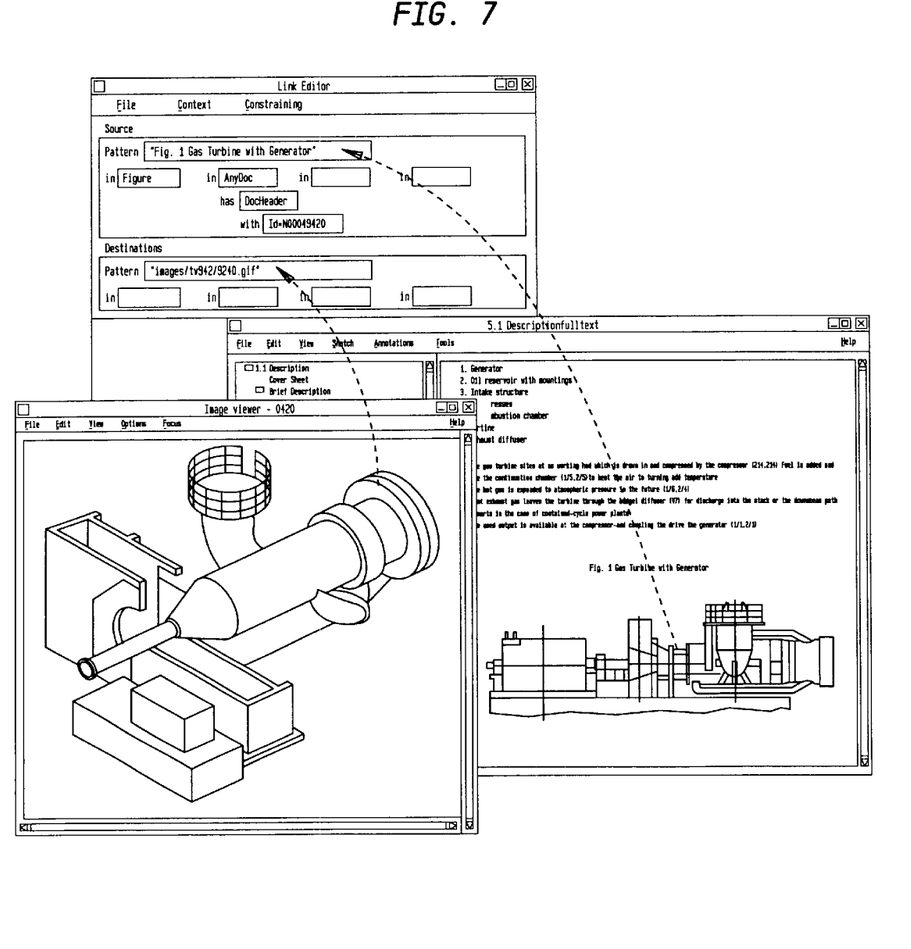
FIG. 7 illustrates an example of capturing a single link.

An example of creating a single link between a textual document and a photo image is shown in FIG. 7. The author opens a textual document with a SGML browser and clicks on the source object, i.e., a figure title, in the textual document. The author then opens a photo image with an image viewer and clicks on the photo image. The source specification is made unique by adding the Id attribute to the <AnyDoc> object and the destination specification is also made unique by using the file name of the photo image directly.

Figure 8:
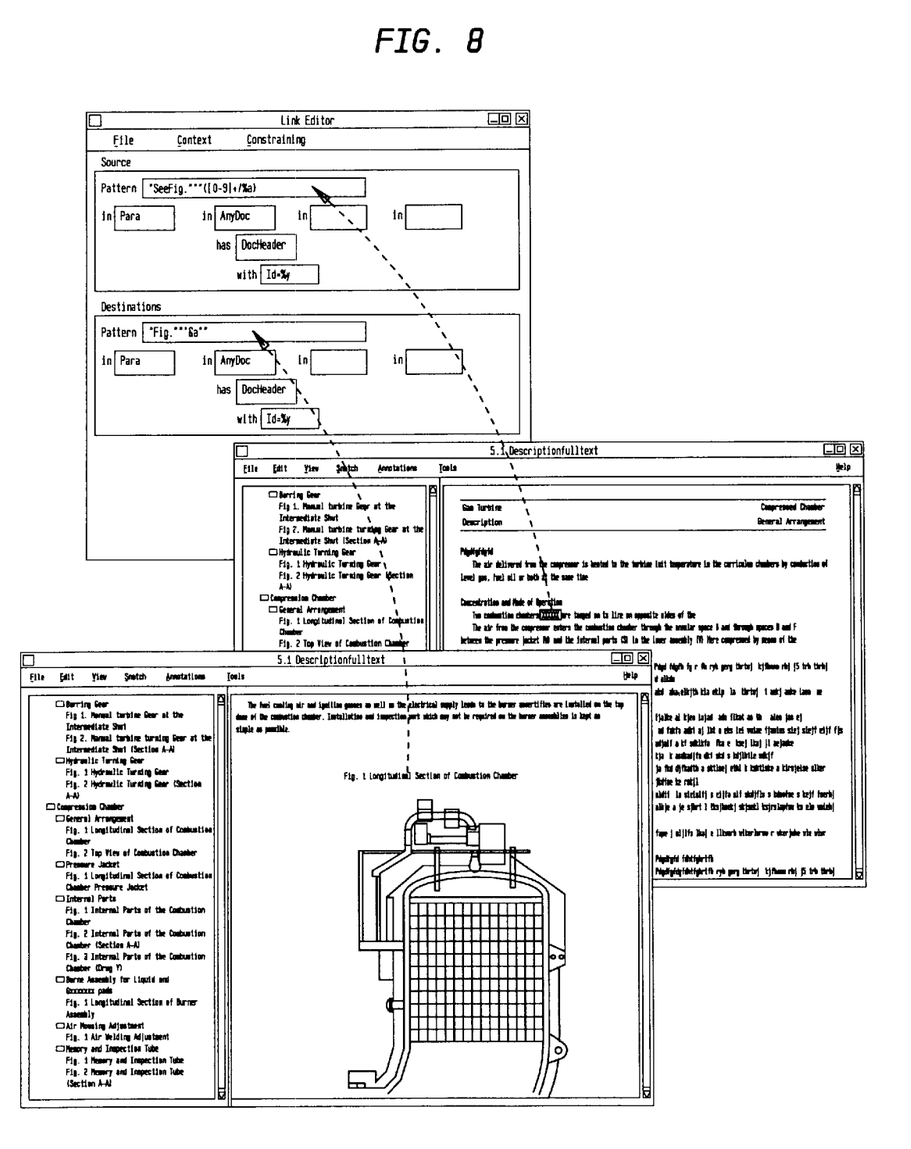
FIG. 8 illustrates an example of capturing a link specification.

An example of creating a link specification is shown in FIG. 8. To indicate the source of the link, the author clicks on a figure reference, "See FIG. 1", in the SGML browser and sends the pattern and context of the source object to the link editor. Next, for the destination of the link, the author clicks on the target figure title and sends the pattern and context of the destination object to the link editor. A variable is created to save the number in the figure reference and this variable is used to refine the figure title in the destination pattern. To ensure that figure references and figure titles are located in the same document, the Id attribute of the <AnyDoc> object is assigned to a variable and is used to constrain the destination context.

The result from the link editor is a link specification file that consists of a list of link rules. Some of the link rules apply to specific individual links while others apply to a group of links that match the specified pattern in the specified context. As shown in FIG. 2, the link specification file is then processed by the automatic hyperlinker 16 to generate the links in the documents.

Figure 9:
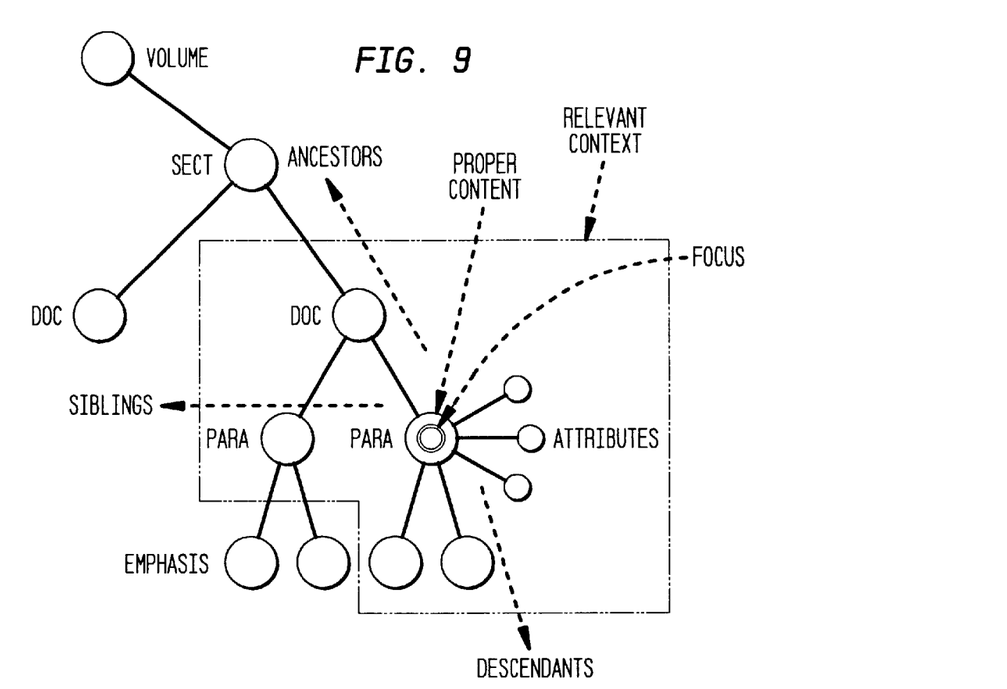
FIG. 9 illustrates principal elements of an object specification.

The following will describe capturing object specifications. The principal elements of a link specification are attributes, proper content, relevant context, and focus of the source and destination objects. This is shown in FIG. 9. In hyperlinking applications, all structure-related information is separated out into the context specification. Thus, "proper content" refers only to the actual text (or any code) of an object. Generally speaking, the context of an object refers to the relationships of all other objects in a document structure except for the object itself. However, for non-trivial link rules (i.e., link rules that produce many links) the exact context (location) of an object is not relevant. Thus, "relevant context" refers only to an immediate sub-structure in which the object is located and is a relationship that involves only some immediate ancestors, descendents, and siblings of the object. The information of focus is mainly for display purposes. As an example, in some cases a destination could be a "big" object such as a CAD drawing. To draw the attention of the user to information, it would be helpful to highlight one or more pieces of information, e.g., a particular signal name, in the destination object.

Thus, the purpose of the capturing mechanisms is to manipulate the syntax of these elements of a source or destination object from the information that the author identifies in a source or destination document. Since the link information identified by the author is specific information from the objects in the documents, it is sometimes too specific and other times too general. Two principles are disclosed to transform link instances into link rules: generalization and specialization. In general, the process of generalizing a specification is to remove some constraints from the specification while the process of specializing a specification is to add more constraints.

Typically, the author highlights a piece of text (i.e., a word or phrase) in a document in an SGML browser. That exact piece of text (e.g., "See FIG. 1") together with the object that contains that text (e.g., <Para>) is sent to the link editor. Such information is good enough to establish a specific link instance. However, that exact piece of text (i.e., "See FIG. 1") is too specific, i.e., it only matches itself in the documents. In most cases, the author may actually want to create a link that applies to all figures, i.e., "See Fig. <number>". Thus, there is a need to provide a mechanism for the author to indicate how such a specific piece of text should be further expanded (i.e., generalized) to match a larger number of instances of similar text. After a source pattern is generalized, some segments of the pattern such as <number> can be used to refine the pattern of the destination (e.g., "Fig. <same number>. <figure title>").

In some cases, the context (i.e., <Para> of "See FIG. 1") obtained from the documents may be too general. As an example, it is useless to match "See FIG. 1" in any paragraph other than a paragraph in the same document (i.e., <Para> inside {<Doc> with <document id>}), assuming that there is more than one document to be hyperlinked. Thus, there is also a need to provide a mechanism for the author to indicate how such a context should be further restricted (i.e., specialization) to make hyperlinking more precise. After a source context is specialized, references to the specified context can be made to refine the context of the destination (e.g., <Figure> inside {<Doc> with <same document id>}).

In general, it depends on the implementation of the link editor, i.e., how specific or general the information is when extracted from the objects in the documents, the concepts of generalization and specialization may be applied to the same part of the object specification. For example, one implementation may choose to provide more contextual information for an object than what the author expects. Then instead of specializing, the author will need to generalize it by removing some unwanted contextual information.

Figure 10:
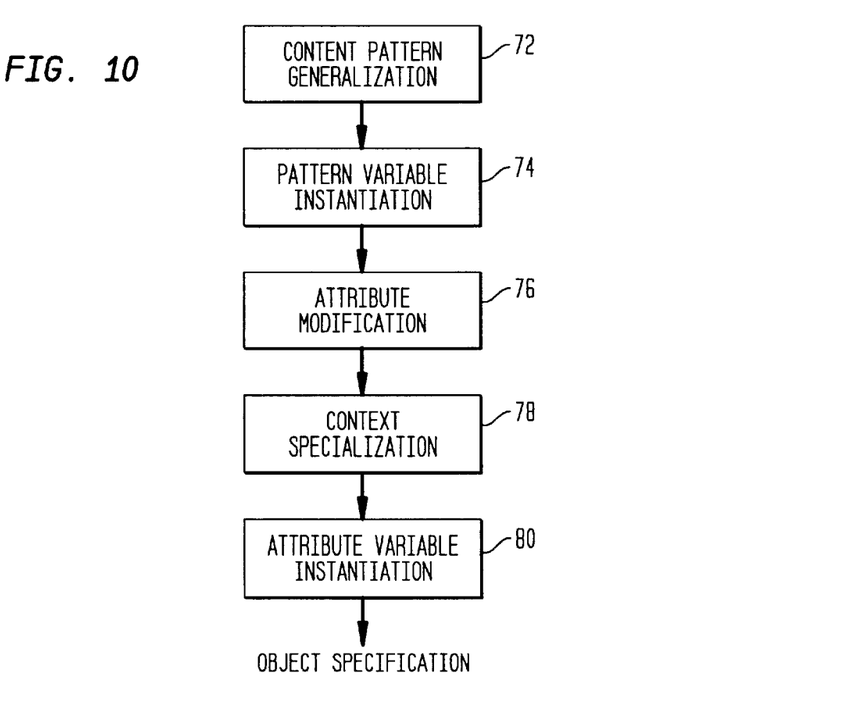
FIG. 10 illustrates a block diagram of capturing an object specification within the link editor.

The typical process of capturing an object specification (for source or destination) is shown in FIG. 10. The content obtained from the object identified in the document is first generalized to refer to a group of objects that have similar content. This is performed in content pattern generalization 72. Some segments of the content pattern are assigned to variables so that the values can be used to further constrain the context of this object, or passed to the object specifications that follow. This is performed in pattern variable instantiation 74. Next, the attributes obtained from the object are modified to make the properties of the object more general or more specific. This is performed in attribute modification 76. For example, adding a specific id to the Id attribute of an object will make the link specification unique enough to create only one single link instance or adding a specific type name to the Type attribute will refer to a group of objects that belong to the same type.

After the information about the object (or a group of objects) is completed, the context of the object is specialized by adding more related objects and specific attributes to the objects in the context specification. This is performed in context specialization 78. Some attributes of the objects can be assigned to variables so that their values can be passed to the object specifications that follow. This is performed in attribute variable instantiation 80.

Figure 11:
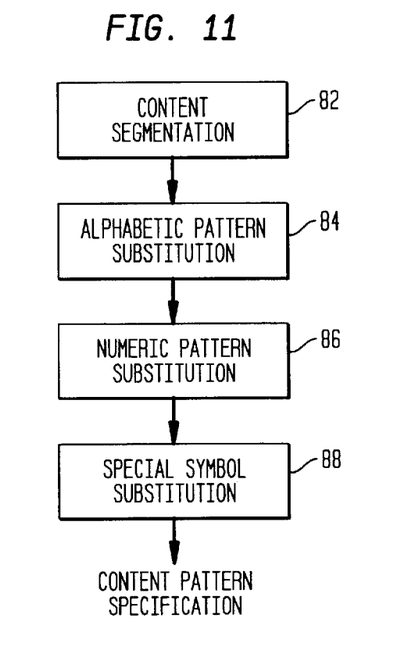
FIG. 11 illustrates a block diagram of generalizing a content pattern.

The following will describe content pattern generalization as shown in FIG. 11. As discussed above, since the documents contain only the actual text (or code), the content information extracted from the object in the documents is often too specific. The content information is first automatically broken into segments based on the classification of the content code. This is performed in content segmentation 82. In particular, most contents are printable ASCII character strings and printable ASCII code is typically divided into three classes: letters, digits, and special symbols. Initially, a content is broken into alphabetic segments, numeric segments, and special symbol segments. In addition, letters can be further divided into two sub-classes: upper-case and lower-case, if necessary. The author can also refine the results of segmentation, i.e., breaking them into smaller segments or merging them into larger segments, based on the semantics of the hyperlinking applications.

The following steps are to replace the three types of content segments with regular expressions. This is described by A. V. Aho and J. D. Ullman in "Principles of Compiler Design", Addison-Wesley, Reading, Mass., 1977. For example, an upper-case letter is replaced with a regular expression "[A–Z]" while a lower-case letter with "[a–z]"; a sequence of letters can be replaced by the same number of "[A–Z]" or "[a–z]" or "[A–Za–z]", or a wild-card such as "+" or "*" can be used to indicate an arbitrary number of code such as "[A–Z]+" or "[A–Z]*". This is performed in alphabetic pattern substitution 84.

Similarly, each digit is replaced with "[0–9]" and a sequence of digits can be replaced with the same number of "[0–9]" or with a wild-card such as "[0–9]+" or "[0–9]*". This is performed in numeric pattern substitution 86. Special symbols in the content information are often unique, i.e., the symbols must match exactly. However, in some cases a content pattern is actually a union of several related patterns. In that case it is necessary to include all related symbols in the pattern. Special symbols can be grouped as follows: "–" and "_"; "+" and "–"; "(", "<", "[", and "{"; ")", ">", "]", and "}"; "/" and "\"; etc. This is performed in special symbol substitution 88.

All literals must be enclosed in a pair of double-quotes. A period followed by a wild-card, i.e., ".*", matches a sequence of single characters until next pattern segment applies. A single wild-card "*" that is not attached to any other terms matches the rest of the content string. A pattern segment enclosed in a pair of "{" and "}" can be assigned to a variable by adding a "/" and a variable name prefixed with an "%".

Figure 12:
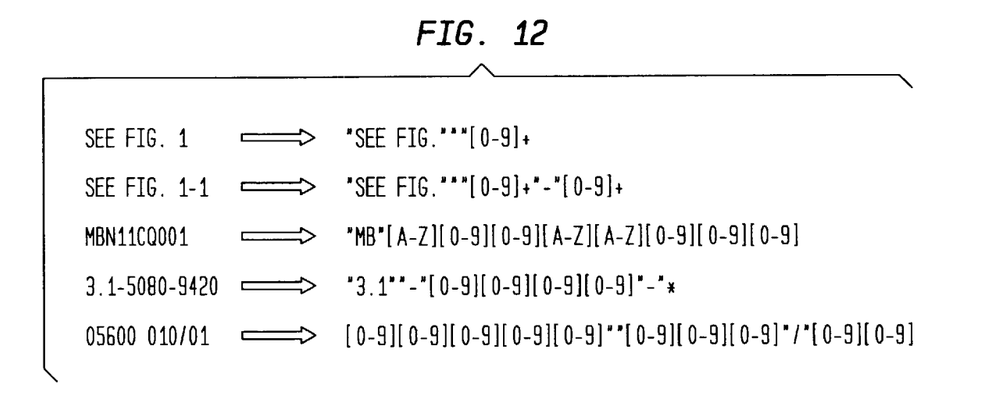
FIG. 12 illustrates examples of generalizing content patterns.

A few examples of content pattern generalization are shown in FIG. 12. In some cases, the author chooses to generalize some segments and leaves other segments as specific as they are. More details on the applications of pattern segments in other parts of a link specification are given below.

The following will describe context specialization. As described above, the relevant contextual information for an object can be as general as one that contains no objects at all or as specific as one that consists of all other objects. Therefore, in most cases, the author will have to adjust the contextual information to make it more precise for the hyperlinking applications. Since an SGML document is a hierarchical structure, the context of an object is specified in terms of its relationships to its ancestors, descendents, and siblings. The hyperlink specification language provides the syntax for specifying the hierarchical structural relationships, i.e., "containing" and "contained" (or "inside"), and for specifying logical relationships, i.e., "and", "or", and "not". In addition, if a context specification begins with a "/", it indicates that the destination object is in the specified context. If a context specification begins with a "~/", it indicates that the destination object is not in the specified context.

Figure 13:
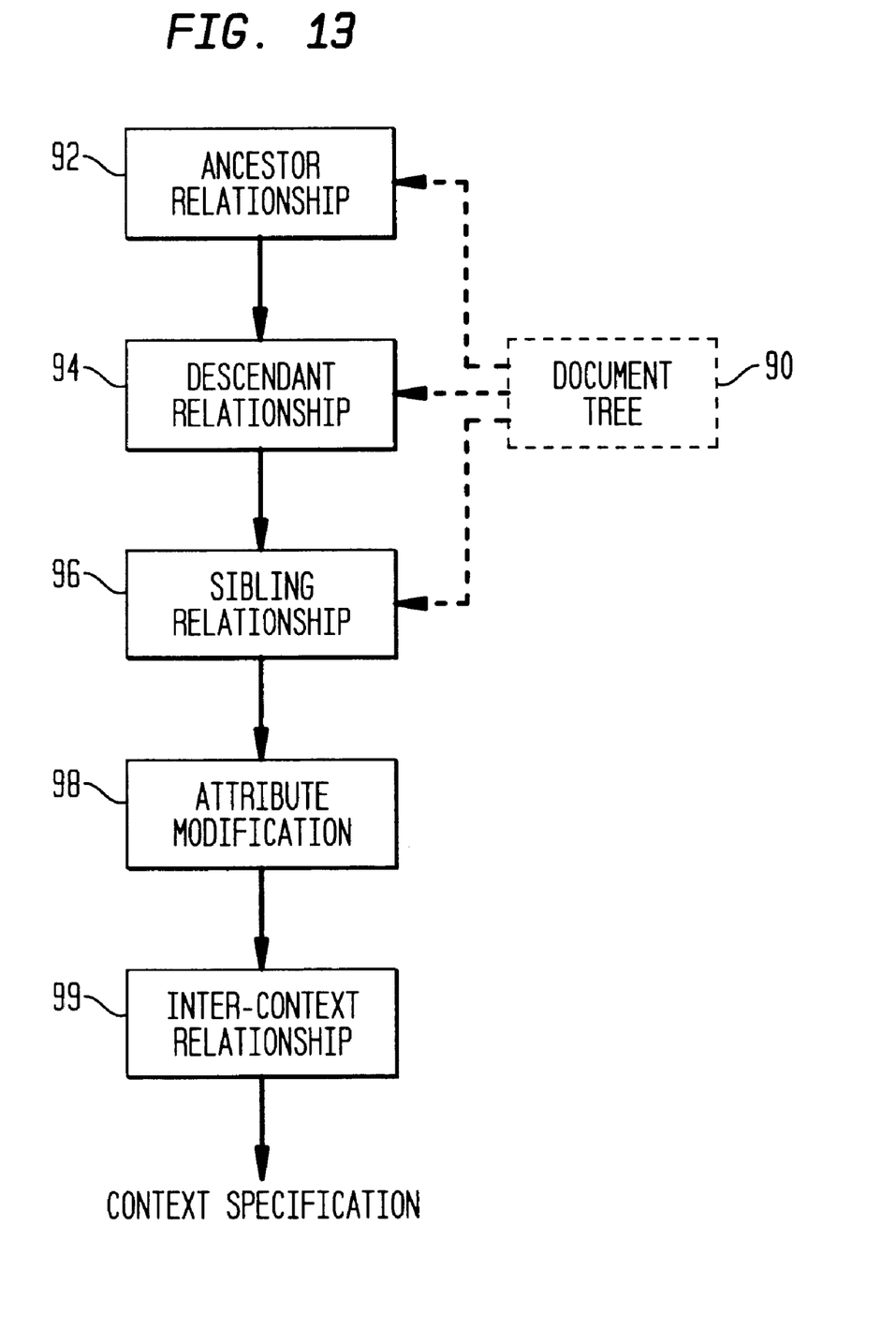
FIG. 13 illustrates a block diagram of specializing a context.

The process of specializing a context specification is shown in FIG. 13. The author first verifies the "scope" of the object by examining its relationship with its ancestors, i.e., if a link specification is targeted to an object within only a specific scope. For example, when identifying a phrase such as "See Fig. <number>", the author will have to decide whether "See Fig. <number>" refers to a "Fig. <number>. <figure title>" within the same <Doc>, or the same <Sect>, or the same <Volume>. So, the author traverses upwards in the document tree 90 to the point where the scope of the object is sufficiently unique for the hyperlinking applications. This is performed in ancestor relationship 92.

Similarly, if an object also has any descendents, constraints on the relationship of the object to its descendent objects can also be included, i.e., within the same scope, only objects that contain a certain type of sub-structure are to be considered. For example, a <Doc> object usually contain <DocHeader> and <DocFooter> objects, of which the structures can be used to determine which <Doc> objects are to be selected. This is performed in descendent relationship 94. In addition to ancestors and descendents, the relationship to any siblings or any descendents of any ancestors can also be included to further constrain the scope of the object. This is performed in sibling relationship 96. In order for the author to easily identify immediate neighboring objects, the link editor also provides a graphical representation of the document tree which can be expanded or collapsed dynamically.

While referencing the objects in the document tree directly is a powerful mechanism to make the object specification more precise there are also multiple instances of these object types. For example, there are usually several <Sect>'s, and each <Sect> has its own <Doc>'s, and each <Doc> has its own <DocHeader> and <DocFooter>. To make distinction among multiple instances of the same object type, attributes are often used (as opposed to using <Sect1>, <Sect2>, . . . ). The author can add attributes of all objects in the context specification to qualify which specific instances of an object type are valid in the context, e.g., <DocHeader> with Id=N05089420. This is performed in attribute modification 98. Contexts can also be specialized by applying other contexts as constraints upon them. This is performed in inter-context relationship 99. Various kinds of operators are possible, including "not in" (same as "~/"), "and in", "scroll to". The "not in" constraint can be characterized as the set of locations A such that they are not in the set of locations B. The "scroll to" constraint can be characterized by the set of locations C but scroll to the set of locations D, where presumably locations C and D are related to each other in some fairly obvious way.

Figure 14:
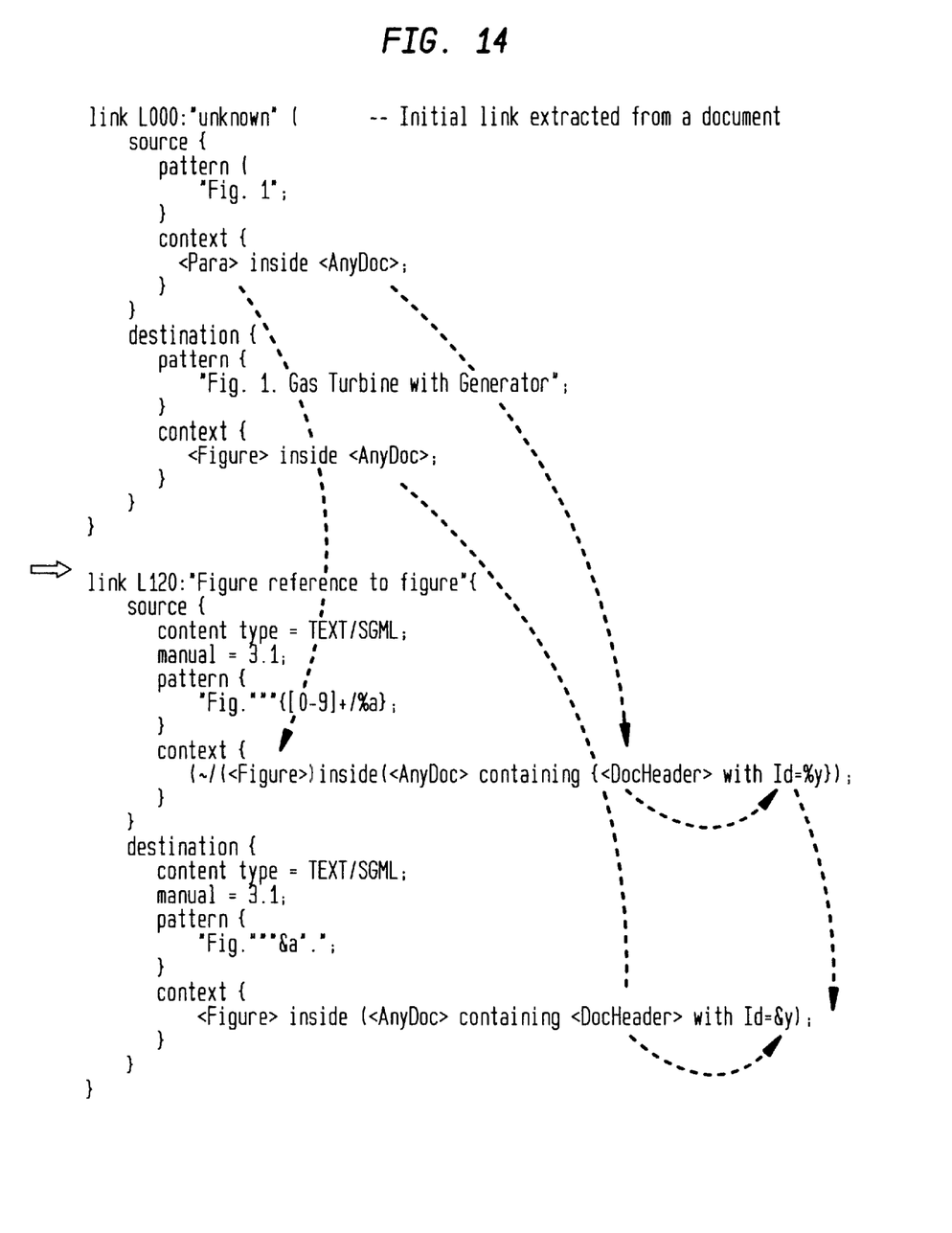
FIG. 14 illustrates examples of specializing contexts.

Two examples of specializing context specifications (i.e., source and destination contexts) are shown in FIG. 14. The <Para> object is replaced with all objects except the <Figure> object, since we are extracting a more general pattern "Fig. <number>" instead of "See Fig. <number>" from the documents and the pattern "Fig. <number>" can be located in many objects in addition to <Para>. The <AnyDoc> object is included to restrict the scope of the figure references and its descendent object <DocHeader> is used to further constrain the type of <AnyDoc>. Furthermore, the Id attribute of the <DocHeader> object is used to match the source and destination <AnyDoc> objects.

It is not intended that this invention be limited to the software arrangement or operational procedures shown disclosed. This invention includes all of the alterations and variations thereto as encompassed within the scope of the claims as follows.

We claim:

1. A system for the automatic capturing of hyperlink specifications for multimedia documents comprising:

SGML converters for receiving textual documents and for providing SGML documents;

AIU (Anchorable Information Unit) extractors for receiving non-textual documents and for providing AIU documents;

an automatic hyperlinker connected to said SGML converters and said AIU extractors;

a link editor connected to said automatic hyperlinker for capturing link rules from link instances by providing generalization and specialization mechanisms for automatically transforming context and content of link instances indicated by authors into link specifications that when executed, automatically generate a plurality of syntactically similar links, wherein said link rules are generated by said link editor between a source specification created from a source document and a final destination specification created from a final destination document when said source and final destinations are provided by a user; and a link manager connected to said automatic hyperlinker for recording link information generated by said automatic hyperlinker during a process of capturing link specifications, wherein said link information is used by said automatic hyperlinker to support incremental hyperlinking and said link information is used to invoke different sets of links on the same set of documents for different applications;

wherein said source and destination specifications are captured by:

generalizing content obtained from an object identified in said source or destination document using content pattern generalization to produce a content pattern;

assigning segments of said content pattern to variables using pattern variable instantiation;

modifying attributes obtained from said object to make properties of said object general or specific using attribute modification;

specializing a context of the object using context specialization; and assigning the attributes of the object to variables using attribute variable instantiation.

2. A system for the automatic capturing of hyperlink specifications for multimedia documents as claimed in claim 1 further comprising:

viewers/browsers connected to said automatic hyperlinker.

3. A system for the automatic capturing of hyperlink specifications for multimedia documents as claimed in claim 1, wherein said link editor further comprises:

an intermediate destination specification connected between said source specification and said final destination specification.

4. A system for the automatic capturing of hyperlink specifications for multimedia documents as claimed in claim 3 wherein said intermediate destination specification comprises:

content pattern generalization for receiving said intermediate destination document;

pattern variable instantiation connected to said content pattern generalization;

attribute modification connected to said pattern variable instantiation;

context specialization connected to said attribute modification; and attribute variable instantiation connected to said context specialization.

5. A system for the automatic capturing of hyperlink specifications for multimedia documents as claimed in claim 4 wherein said content pattern generalization comprises:

content segmentation;

alphabetic pattern substitution connected to said content segmentation;

numeric pattern substitution connected to said alphabetic pattern substitution; and special symbol substitution connected to said numeric pattern substitution.

6. A system for the automatic capturing of hyperlink specifications for multimedia documents as claimed in claim 4 wherein said context specialization comprises:

ancestor relationship;

descendent relationship connected to said ancestor relationship;

sibling relationship connected to said descendent relationship;

attribute modification connected to said sibling relationship; and inter-context relationship connected to said attribute modification.

7. A system for the automatic capturing of hyperlink specifications for multimedia documents as claimed in claim 1, wherein said content pattern generalization comprises:

content segmentation;

alphabetic pattern substitution connection to said content segmentation;

numeric pattern substitution connected to said alphabetic pattern substitution; and special symbol substitution connected to said numeric pattern substitution.

8. A system for the automatic capturing of hyperlink specifications for multimedia documents as claimed in claim 1, wherein said context specialization comprises:

ancestor relationship;

descendent relationship connected to said ancestor relationship;

sibling relationship connected to said descendent relationship;

attribute modification connected to said sibling relationship; and inter-context relationship connected to said attribute modification.

9. The system of claim 1, wherein said link information comprises information indicating what said automatic hyperlinker does during the process of capturing link specifications and reminds authors of what said automatic hyperlinker has done in the past during the process of capturing link specifications.

10. A system for the automatic capturing of hyperlink specifications for multimedia documents comprising:

a link editor comprising:

a source specification created from an object in a source document; and a final destination specification created from a final destination document;

wherein said link editor provides generalization and specialization mechanisms for transforming context and content of link instances indicated by authors into link specifications that when executed can automatically generate syntactically similar links, each link instance being created by an author by selecting an object in a multimedia document, wherein said source and destination specifications are captured by:

generalizing content obtained from an object identified in said source or destination document using content pattern generalization to produce a content pattern;

assigning segments of said content pattern to variables using pattern variable instantiation;

modifying attributes obtained from said object to make properties of said object general or specific using attribute modification;

specializing a context of the object using context specialization; and assigning the attributes of the object to variables using attribute variable instantiation.

11. A system for the automatic capturing of hyperlink specifications for multimedia documents as claimed in claim 10 wherein said link editor further comprises:

an intermediate destination specification connected between said source specification and said final destination specification.

12. A method for the automatic capturing of hyperlink specifications for multimedia documents comprising the steps of:

converting textual documents to SGML documents;

converting non-textual documents to AIU documents;

creating link specifications with a link editor, the link editor providing generalization and specialization mechanisms for automatically transforming context and content of link instances indicated by authors into link specifications that when executed can automatically generate syntactically similar links, each link instance being created by selecting an object in a multimedia document, wherein said link specifications are generated by said link editor between a source specification created from a source document and a final destination specification created from a final destination document when said source and final destinations are provided by a user; and automatically hyperlinking said SGML documents, said AIU documents and said link specifications to provide linked documents, wherein said source and final destination specifications are captured by:

generalizing content obtained from an object identified in said source or destination document using content pattern generalization to produce a content pattern;

assigning segments of said content pattern to variables using pattern variable instantiation;

modifying attributes obtained from said object to make properties of said object general or specific using attribute modification;

specializing a context of the object using context specialization; and assigning the attributes of the object to variables using attribute variable instantiation.

* * * * *